Dec. 2, 1952     R. L. MEYERS     2,620,073

MILK CAN RACK

Filed May 16, 1949

INVENTOR.
ROY LAMBERT MEYERS
BY Juaw. D Jefft
ATTORNEY

Patented Dec. 2, 1952

2,620,073

UNITED STATES PATENT OFFICE 2,620,073

MILK CAN RACK

Roy Lambert Meyers, Janesville, Wis.

Application May 16, 1949, Serial No. 93,510

1 Claim. (Cl. 211—85)

My invention relates to milk can racks and more particularly to racks which may be readily assembled from a knock-down condition against or upon walls.

An object of my invention is to provide a sturdy knock-down rack which may be readily assembled and disassembled upon a wall portion to support heavy milk cans and accessories following the necessary cleaning operation.

Another object of my invention is in the provision of a readily assembled milk can rack having removable and easily cleanable cross members normally supporting the milk cans and associated parts in a position to permit complete draining and drying after the cleaning operation.

Still another object of my invention is to provide a readily assembled wall type milk can rack that will support the milk cans and associated parts in an elevated position for complete draining and drying.

Yet another object of my invention is in the provision of a knock-down milk can rack which may be readily assembled and disassembled against a wall member, the rack having outwardly extending floor supports.

Other objects of my invention will appear when taken in connection with the following specification and the accompanying drawings in which.

Figure 1:
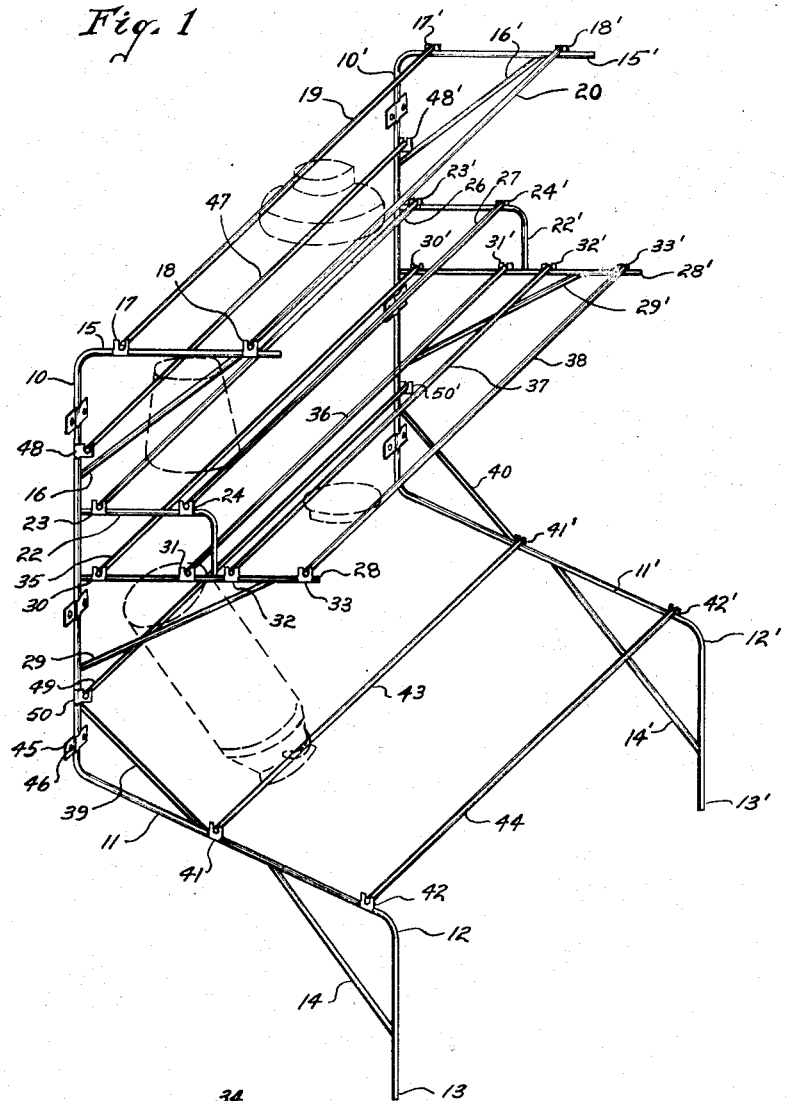
Fig. 1 is a perspective view of my knock-down wall rack in operative assembled position against a wall member.

Referring specifically to the drawings, we find in Fig. 1 dual wall and floor supported bracket members comprising the following portions:

Inasmuch as the dual brackets are fashioned in exactly the same manner they will be given similar identification numbers, the second support being indicated in prime numbers.

Vertically disposed spaced wall contacting members 10 and 10' have integrally formed therewith or welded thereto dual supporting members 11 and 11'.

These horizontally disposed outwardly projecting parts 11 and 11' have their outer ends bent downwardly as at 12 and 12' to form legs 13 and 13'.

These dual floor contacting legs 13 and 13' may be suitably braced by means of diagonally disposed portions 14 and 14' welded to parts 11 and 11' and 13 and 13' respectively.

Integrally formed with or welded to the upper ends of members 10 and 10' are dual horizontal short supporting arms 15 and 15', said arms finding additional bracing means in the diagonal supports 16 and 16' welded to the outer ends of the short arms and to the wall contacting members.

The spaced supporting arms 15 and 15' have welded or affixed thereon brackets 17, 18 and 17' and 18', said brackets being provided with slots 34 adapted to receive the dual cross rods 19 and 20.

Figure 2:
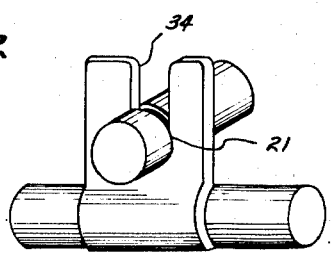
Fig. 2 is an enlarged detail showing the groove and slot cross rod assembly.

Cross rods 19 and 20 have their ends grooved in the plural manner shown at 21 in Fig. 2, to detachably engage the before-mentioned slots 34 in brackets 17, 18 and 17' and 18' on arms 15 and 15'.

A second pair of short supporting arms 22 and 22' are welded to the wall contacting members 10 and 10' the desired distance below the before-described arms 15 and 15'.

Supporting arms 22 and 22' are provided with brackets 23, 24 and 23', 24' which have slots 34 to receive the grooves 21 in the ends of detachable cross rods 26 and 27.

A third set of rod supporting arms 28 and 28' are welded to members 10 and 10' a short distance below arms 22 and 22'.

These arms 28 and 28' are again braced in a similar manner by means of diagonal welded braces 29 and 29'.

Supporting arms 28 and 28' are provided with brackets 30, 31, 32, 33 and 30', 31', 32', 33', which have slots 34 adapted to receive the grooves 21 in the ends of detachable cross rods 35, 36, 37 and 38.

Additional diagonal welded braces 39 and 40 are provided to further strengthen and connect the horizontal members 11, 11' with wall members 10 and 10'.

Brackets 41, 42, and 41', 42' are affixed to the members 11 and 11', and are provided with slots 34 which receive the grooves 21 in the ends of the detachable cross rods 43 and 44.

Plural attachment straps 45 and fasteners 46 permit a swingable connection of the supporting wall members 10 and 10' upon a wall. Thus said wall members can be swung about a vertical axis so that the supporting arms 15, 22, 28, and 15', 22', 28' extend out perpendicularly from said wall. The rack may then be assembled by mating the grooves 21 in the ends of the detachable cross rods 19, 20, 26, 27, 35, 36, 37, 38, 43, 44, 47, and 49, to the slots 34 in the respective brackets affixed to the supporting members. When the grooves 21 engage slots 34, a rigid, but easily assembled and disassembled milk can rack results. When the cross rods are removed, the supporting members 10 and 10', and their supporting arms, can be swung flat against the wall, and out of the way.

Additional detachable cross rods 47 and 49 adapted to engage slots 34 in brackets 48, 50 and 48', 50' on members 10 and 10', may be utilized as back supports for articles placed on the rack.

The drawings disclose a single assembled milk can rack, but it is obvious that the rack may be extended to any length desired by using plural wall contacting sections and longer cross supporting rods.

The drawings also include disclosures of several of the main elements necessarily requiring careful cleaning following the milking operation.

These elements disposed in operative drying position include a milk can, milk can cover, milk pail and strainer.

I claim:

A knock-down milk can rack comprising spaced swingably wall-mounted floor contacting supporting members, plural arms projecting horizontally from said supporting members, bracing means for said plural arms, brackets affixed to said arms, cross rod receiving slots in said brackets, and plural cross rods grooved at their ends to engage said slotted brackets.

ROY LAMBERT MEYERS.

REFERENCES CITED

The following references are of record in the file of this patent:

UNITED STATES PATENTS

| Number | Name | Date |
|---|---|---|
| D. 28,772 | Morrow | May 31, 1898 |
| 1,035,967 | Keil | Aug. 20, 1912 |
| 1,283,326 | Schreck | Oct. 29, 1918 |
| 1,623,392 | Davidson | Apr. 5, 1927 |
| 1,716,862 | McEntire | June 11, 1929 |
| 1,752,985 | Huffman | Apr. 1, 1930 |
| 2,227,886 | Jungholm | Jan. 7, 1941 |
| 2,243,370 | Bell | May 27, 1941 |
| 2,449,628 | Swintosky | Sept. 21, 1948 |

FOREIGN PATENTS

| Number | Country | Date |
|---|---|---|
| 419,661 | Germany | Oct. 8, 1925 |